United States Patent [19]

Saito

[11] 4,135,316
[45] Jan. 23, 1979

[54] TAPE CASSETTES HAVING INDICATIONS FOR BLIND USE

[75] Inventor: Shoichi Saito, Tokyo, Japan

[73] Assignee: Olympus Optical Co., Ltd., Tokyo, Japan

[21] Appl. No.: 834,564

[22] Filed: Sep. 19, 1977

Related U.S. Application Data

[62] Division of Ser. No. 702,583, Jul. 6, 1976, Pat. No. 4,063,370.

[30] Foreign Application Priority Data

Jul. 9, 1975 [JP] Japan ................................. 50-95926
Jul. 14, 1975 [JP] Japan ................................. 50-96731

[51] Int. Cl.² ........................................... G09B 21/00
[52] U.S. Cl. ................................. 35/35 A; 35/35 C; 116/205; 116/DIG. 17; 242/199
[58] Field of Search ................ 35/35 A, 35 C, 38; 116/114 G, DIG. 17; 242/199; 360/132, 137

[56] References Cited

U.S. PATENT DOCUMENTS

| 1,222,369 | 4/1917 | Duncan | 116/DIG. 17 |
| 2,522,423 | 9/1950 | Youhouse | 116/114 G |
| 2,937,818 | 5/1960 | Zorn | 242/199 |
| 3,630,170 | 12/1971 | Christo | 360/137 X |
| 3,718,290 | 2/1973 | Wright | 242/199 |
| 4,063,370 | 12/1977 | Saito | 35/35 A |

*Primary Examiner*—William H. Grieb
*Attorney, Agent, or Firm*—Ostrolenk, Faber, Gerb & Soffen

[57] ABSTRACT

A tape cassette is provided with a recess or projection indicative of the front or rear side of the cassette, the playing time of the tape contained, the running speed of the tape or the like, which recess or projection is disposed along the peripheral edge of a window formed in a label applied to either surface or to both surfaces of the cassette and which can be utilized for tactile determination of the front or rear side of the cassette, the kind of the tape contained or the like by the blind.

10 Claims, 10 Drawing Figures

TAPE CASSETTES HAVING INDICATIONS FOR BLIND USE

RELATED APPLICATIONS

This is a divisional of U.S. patent application Ser. No. 702,583, filed July 6, 1976 now U.S. Pat. No. 4,063,370, issued Dec. 20, 1977.

BACKGROUND OF THE INVENTION

Cassettes for use in tape recorders can be easily mounted and operated as compared with those disposed on open reels, and find an extensive use amoung the blind. As is well recognized, during a record or playback operation, the magnetic tape in a tape cassette is run in one direction until the tape end is reached, whereupon the cassette must be removed from the tape recorder to invert it before it is loaded again to be run in the opposite direction. The front and rear sides of a tape cassette is usually designated by indicia such as A, B (see FIGS. 1 and 2) or 1, 2, which are printed on a label applied to both the front and rear sides of the cassette.

However, these indicia cannot be recognized by the blind. To overcome this difficulty, there has been a proposal to emboss either one of the indicia applied to the label in order to permit a distinction of the front from the rear surface. However, with a tape cassette of a miniature size, the indicia themselves will be reduced in size and an easily recognizable indicium cannot be formed. In addition, with a tape cassette of a miniature size, various openings such as openings for fitting the drive shafts of hubs of tape reels, a capstan aperture and positioning pin apertures of the cassette are dispersed throughout the both surfaces, so that it becomes difficult to make a positive distinction between such opening or apertures and the embossed indicia.

In addition, the playing time or the tape running speed depends on the tape contained in a cassette, and an indication of the kind of the tape is usually given on the label applied to the cassette. Thus, providing a distinction between the front and rear sides of the cassette by tactile response alone is not sufficient for blind use. Therefore, it is apparent that there has been a need for a tape cassette which is adapted for blind use.

SUMMARY OF THE INVENTION

It is a first object of the invention to provide a tape cassette having an indication for blind use which overcomes the above difficulties by providing a recess capable of indicating the front or rear surface of the cassette by a tactile impression, at a location free from other openings or projections formed in the cassette, namely, in the peripheral edge of the cassette, and also providing indicium rear surface of the recess in the form of either recess or projection or a label applied so that a person having the usual sight can teach a blind person what is indicated by the recess, thus enabling the blind to determine the front or rear side of the cassette by tactile impression of the recess.

It is a second object of the invention to provide a tape cassette having an indication for blind use of the type described which additionally includes a recess or projection indicative of the kind of the tape contained, namely, the playing time or the tape running speed, along the inner periphery of a window formed in a label applied to the central region of the cassette surfaces.

DETAILED DESCRIPTION OF EMBODIMENTS

Figure 1:
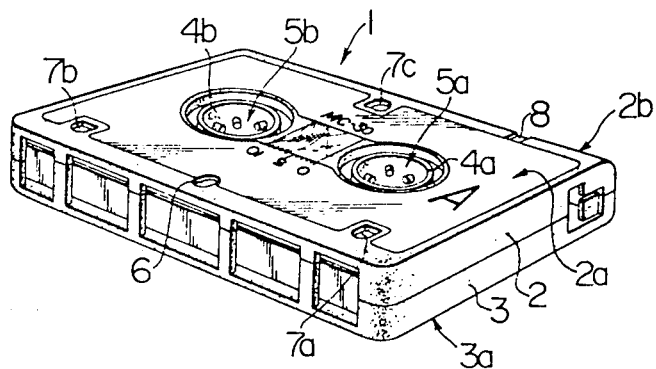
FIG. 1 is a perspective view of a tape cassette of a miniature size which is provided with a recess along the peripheral edge of either the front or rear surface in accordance with the invention.
Figure 2:
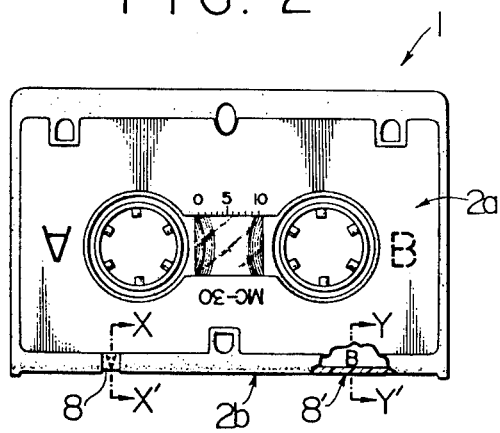
FIG. 2 is a plan view of the cassette shown in FIG. 1.

Referring to FIGS. 1 to 5, there is shown a first embodiment of the invention as applied to a tape cassette of the miniature size which has been developed by the present applicant. Referring to FIG. 1, there is shown a cassette 1 which is formed of a transparent material in a symmetrical configuration with respect to the centerline thereof. Specifically, it comprises a pair of a front and a rear cassette member 2, 3 disposed in abutting relationship, these members being referred to herein as cassette halves. The edge or boundary between the front major surface 2a and the rear sidewall 2b is arcuately curved, and is partly formed with a recess 8 as shown in FIGS. 1 and 2, which provides an indication for blind use.

Figure 4:
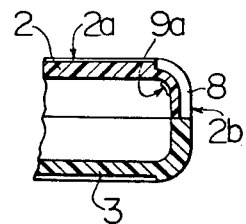
FIGS. 4 and 5 are fragmentary enlarged cross sections taken along the lines X-X' and Y-Y' shown in FIG. 2.
Figure 3:
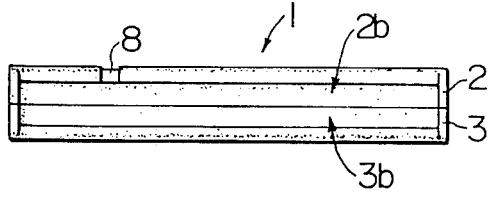
FIG. 3 is a rear view of the cassette shown in FIG. 1.
Figure 5:
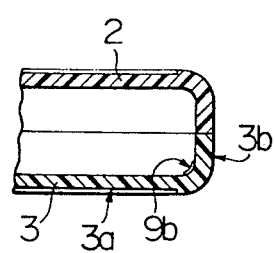

Referring to FIG. 4 which shows a cross section taken along the line X-X' of FIG. 2, the construction of the recess 8 is shown in detail. On the inner surface 9a of the cassette wall in which the recess 8 is formed, there is provided an indicium A indicative of the front major surface which may be either embossed, relieved or formed by a label. The indicium A is visible from the exterior through the transparent front member 2.

At a position symmetrical to the recess 8 with respect to the parting line between the cassette halves, the rear member 3 is provided with an indicium B indicative of the rear surface, the indicium B being provided on the inner surface of the rear member 3. Again the indicium B extends along the curved region between rear major surface 3a and the rear side surface 3b, and is visible from the exterior through the rear member 3.

In use, it is readily possible for the blind to recognize the front surface by sensing, through tactile response, the presence of the recess 8 and to recognize the rear major surface as a result of the absence of the recess. It will be understood that the recess may be provided in the rear member, and that the indicia A, B may be replaced by numerals 1, 2. In addition, it is also possible to provide a plurality of recesses, which may have either similar or different configurations, so that the combination of the recesses permits a determination as to the kind of the tape contained in the cassette. However, if such plurality of recesses are formed around the periphery of the both front and rear surfaces of the cassette, their provision in a limited space may lead to a mistaken reading without a certain degree of skill on the part of the blind. Therefore, it is preferred that a single recess be provided along the periphery of either front or rear surface of the cassette to facilitate the determination of the front or rear surface, and that a recess or projection be separately provided at a different location in order to indicate the kind of the tape contained in the cassette.

Figure 6:
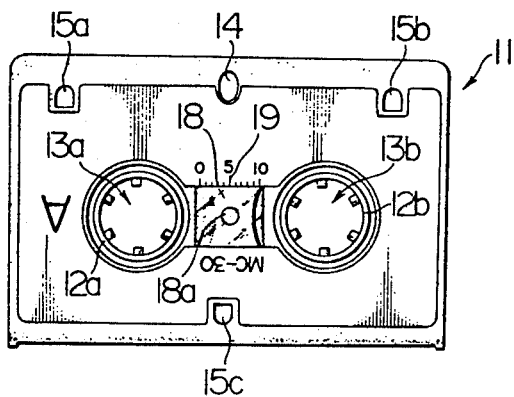
FIG. 6 is a plan view of a conventional tape cassette of miniature size.
Figure 7:
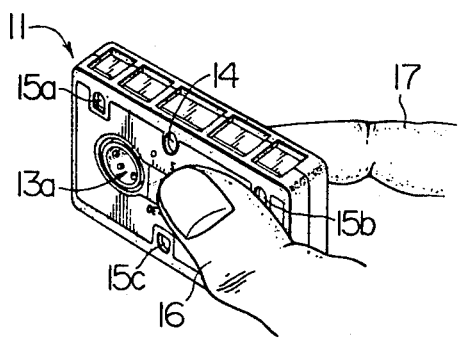
FIG. 7 is a perspective view, illustrating the handling of the tape cassette shown in FIG. 6.

A preferred location for the provision of the recess or projection which indicates the type of the tape is in the window formed in the central region of the cassette. A cassette is already known which is provided with an indication of the front and the rear surface of the cassette by providing either recess or projection in such region. This is illustrated in FIG. 6 wherein a tape cassette 11 of a miniature size is shown as being provided with various openings or apertures including a pair of openings 13a, 13b in which the drive shaft of tape hubs 12a, 12b is fitted, a capstan aperture 14, and a plurality of positioning pin apertures 15a, 15b, 15c for the cassette 11. These openings and apertures are distributed throughout a limited area on both the front and rear surfaces thereof. It is readily apparent therefore that an indicium cannot be provided in such region without causing a mistaken reading. Usually such a tape cassette is received in a vertical position in its receiving case. Thus, when removing it from the case, it will be held between the thumb 16 and the index finger 17 of the hand, holding both major surfaces of the cassette 11 as shown in FIG. 7. At this time, the flanks of the thumb and the index finger will be applied against the center area of the both surfaces of the cassette 11. As is well known, the opposite cassette surfaces are centrally provided with transparent windows 18 (see FIG. 6) at a position intermediate the pair of hubs 12a, 12b on which the magnetic tape is disposed. The purpose of such transparent window is to allow an observation from the exterior of how much of the tape is received or taken up on either hub 12a, 12b. To this end, a scale 19 is provided in or adjacent to the windows 18 for indicating the amount of the rest of the tape which is going to be taken up. Thus it will be seen that when handling the tape cassette 11, the area of the window 18 will be engaged by the flanks of both fingers. The locations on the both surfaces of the cassette 11 which can be easily recognized by tactile impression are the openings 13a, 13b in which the pair of reel hubs 12a, 12b are fitted, so that the area of the window 18 can be easily located since it is situated intermediate the two openings 13a, 13b. On the basis of this recognition, a recess or projection 18a is provided in the area of such transparent window for indicating either front or rear surface of the cassette 11.

In accordance with the invention, a label is applied to both surfaces of the tape cassette, and a window is formed in the label in alignment with the window which is originally provided to permit an observation of the tape running. The inner periphery of the window in the label is provided with a recess or a projection so that its configuration or combination (where a plurality of recesses or projections are provided) permits a recognition of the kind of the tape, namely, the playing time or the tape running speed, through tactile sensing.

Figure 8:
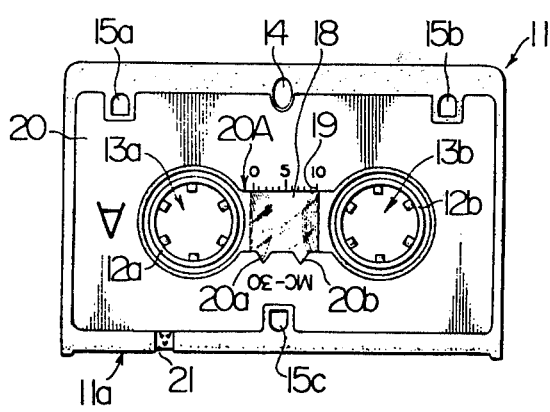
FIG. 8 is a plan view of a tape cassette in accordance with another embodiment of the invention in which a recess or projection is formed along the inner periphery of a window formed in a label.

Specifically, referring to FIG. 8, there is shown an enlarged plan view of the front surface (surface A) of a tape cassette of a miniature size to which the invention is applied. A label 20 is applied to the front surface. A window 20A is centrally formed in the label 20 in conformity to a transparent window 18 which is originally provided in the cassette intermediate the both hubs 12a, 12b for the purpose of observation of the tape running. The inner periphery of the windown 20A is formed with a pair of triangular notches 20a, 20b in its lower side, the presence of these notches indicating that the internally housed tape has a playing time of thirty minutes. A recess 21 is formed along the periphery of the cassette for indicating the front or rear surface of the tape cassette 11.

Figure 9:
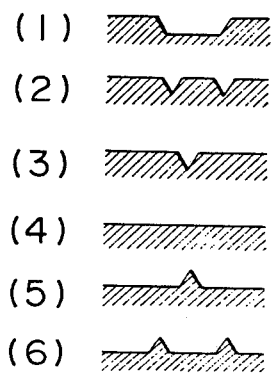
FIGS. 9(1) to (6) are cross sections, illustrating various forms of the recess or projection provided in or on the inner periphery of a window formed in a label.
Figure 10:
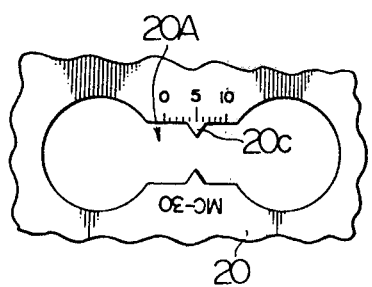
FIG. 10 is a plan view of another form of projections provided on the inner periphery of the window.

It will be appreciated that the indication illustrated above in the form of a pair of triangular recesses may be in any other form such as projections, and a combination of such recesses or notches or projections may be utilized in a manner corresponding to a variety of playing times. Referring to FIGS. 9(1) to (6), the inner periphery of the window in the label may be formed wth a relatively large recess (1) to indicate a playing time of 15 minutes, formed with a pair of triangular notches (2) to indicate a playing time of 30 minutes, formed with a single triangular notch (3) to indicate a playing time of 45 minutes, or without any recess or notch (4) to indicate a playing time of 60 minutes, formed wth a single triangular projection (5) to indicate a playing time of 90 minutes, or formed with a pair of triangular projections (6) to indicate a playing time of 120 minutes. While the above deals with only the playing time, a desired tape running speed may be indicated by an arrangement as shown in FIG. 10. In this instance, an indication in the form of a recess or projection may be provided in the upper side of the inner periphery of the window formed in the label. FIG. 10 shows a single triangular projection 20c formed in the upper side together with a single projection on the lower side, indicating that the tape is to be run at a lower speed and has a playing time of 90 minutes.

While in the embodiment described above, an indication has been provided in or on the periphery of the cassette for indicating the front or rear surface of the cassette, it will be understood that all of the recesses or projections mentioned above may be concentrated in or on the inner periphery of the window formed in the label. Since the label used for the purpose of the invention is usually provided on common tape cassettes, any significant increase in the cost can be effectively avoided. In addition, while the invention has been described as applied to a tape cassette of a miniature size, it is equally applicable to other types of tape cassettes such as those of a compact size.

What is claimed is:

1. A tape cassette having at least one finger readable marking, comprising:
   a cassette housing formed by front and rear cassette members (2, 3);
   a finger readable recess (8) formed in the periphery of one of said front and rear members, said recess being formed of a transparent material and being indicative of the location of the front and rear surface of said cassette; and
   visual indicia (9a) formed on the inner surface of said transparent material at the location of said recess such that said visual indicia may be viewed from the exterior of said cassette; said visual indicia being indicative of the location of said front and rear surface of said cassette.

2. The tape cassette of claim 1 wherein one of said front and rear cassette members has at least one major surface and wherein said cassette further comprises:

- a transparent window formed in said at least one major surface, said transparent window being located at a position relative to the position of the magnetic recording tape housed in said cassette which will permit viewing of the movement of at least a portion of said tape in said cassette;
- a label applied to said at least one major surface of said cassette, said label having an opening therein, said opening being defined by inner peripheral edges of said label and overlapping said transparent window a sufficient amount to permit viewing of the movement of at least a portion of said tape, said label also including at least one finger readable tape-identifying indicia formed along and defined by said inner peripheral edges of said label, the shape and number of said at least one finger readable indicia being indicative of some quality of said tape such as the total playing time or running speed thereof.

3. A tape cassette according to claim 2, wherein said at least one finger readable indicia comprises a projection formed along said inner peripheral edges of and defined in the plane of said label.

4. A tape cassette according to claim 2, wherein the presence or absence of a second projection formed along an opposing edge of said inner peripheral edges from a first projection is indicative of the running speed of said tape 5. A tape cassette according to claim 2, wherein a single projection formed along said inner peripheral edges of said label indicates a playing time of 90 minutes.

6. A tape cassette according to claim 2, wherein said at least one finger readable indicia comprises an indentation formed along said inner peripheral edges of and defined in the plane of said label.

7. A tape cassette according to claim 2, wherein two projections formed along said inner peripheral edges of said label indicate a playing time of 120 minutes.

8. A tape cassette according to claim 7, wherein a single, relatively large recess formed along said inner peripheral edges of said label indicates a playing time of 15 minutes.

9. A tape cassette according to claim 7, wherein a single triangular notch formed along said inner peripheral edges of said label indicates a playing time of 45 minutes.

10. A tape cassette according to claim 7, wherein a pair of triangular notches formed along said inner peripheral edges of said label indicates a playing time of 30 minutes.

* * * * *